Sept. 30, 1958  J. D. BALDWIN, JR., ET AL  2,854,021
RELIEF VALVE
Filed Feb. 11, 1954
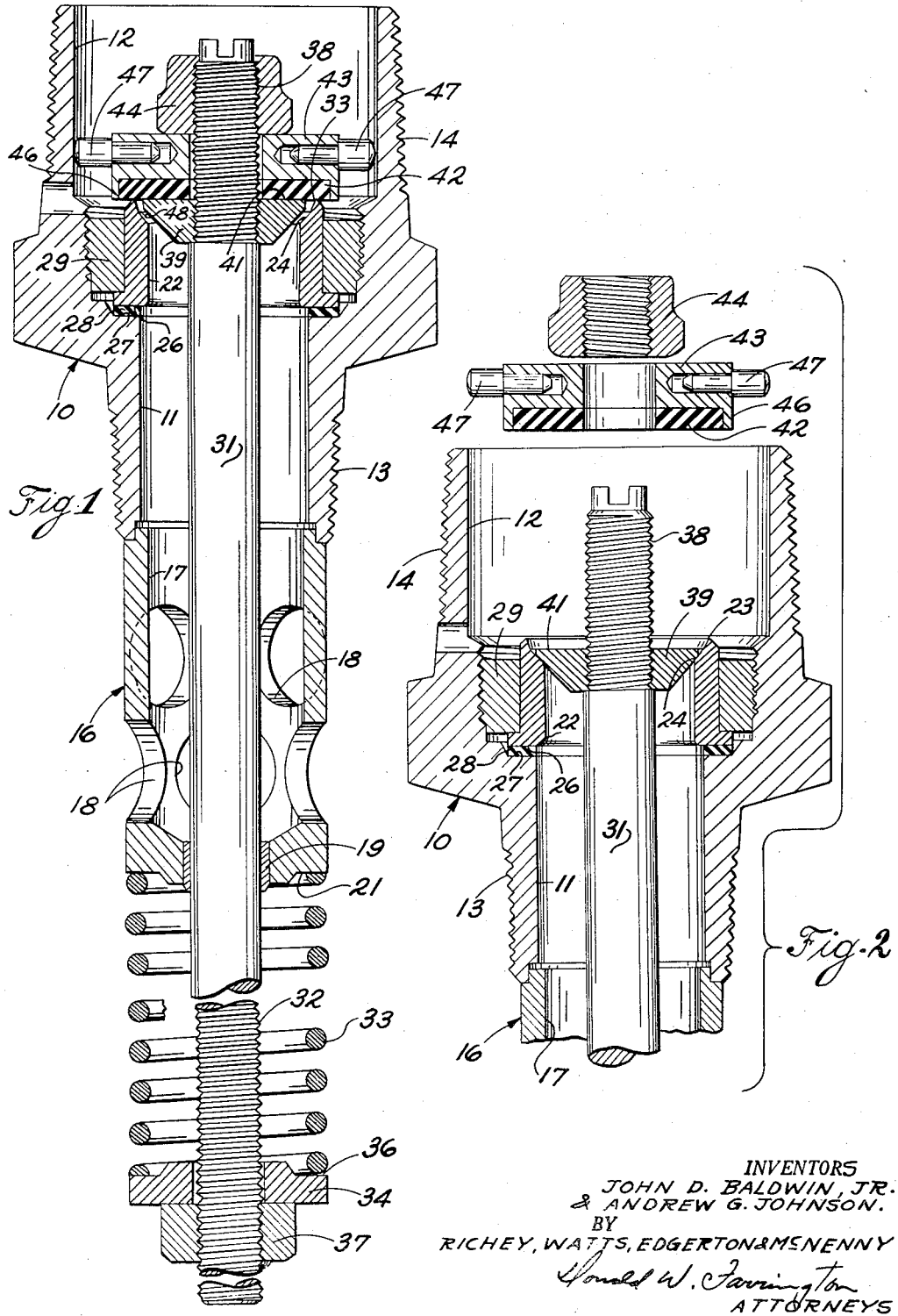
INVENTORS
JOHN D. BALDWIN, JR.
& ANDREW G. JOHNSON.
BY
RICHEY, WATTS, EDGERTON & McNENNY
Donald W. Farrington
ATTORNEYS United States Patent Office 2,854,021
Patented Sept. 30, 1958

2,854,021

RELIEF VALVE

John D. Baldwin, Jr., Highland Heights, and Andrew G. Johnson, Lakewood, Ohio, assignors to The Weatherhead Company, Cleveland, Ohio, a corporation of Ohio Application February 11, 1954, Serial No. 409,695

2 Claims. (Cl. 137—329.4)

This invention relates generally to relief valves and more particularly to a relief valve wherein the sealing member may be replaced while the valve is under pressure without loss of fluid.

Safety relief valves are often mounted directly on pressure vessels or integrally in fluid pressure systems. It is therefore highly desirable to be able to service the valve without disturbing the pressure of the system so that the sealing member may be replaced while the valve is under pressure without loss of fluid. Past attempts have resulted in sacrifice of accuracy of valve operation in order to accomplish this end. Of course, those skilled in the art will realize that relief valves by very necessity must be accurate in their operation so as to insure proper protection of the system.

It is an important object of this invention to provide a highly accurate safety relief valve wherein the sealing member may be serviced and replaced while the system is under pressure.

It is another object of this invention to provide an easily manufactured relief valve wherein a primary sealing member is provided to normally seal the fluid under pressure and wherein a secondary sealing member may be utilized to maintain the pressure of the fluid while the primary sealing member is being serviced or replaced.

Further objects and advantages will appear from the following description and drawings, wherein;

Fig. 1 is a cross sectional view of the complete relief valve according to this invention shown in its normally closed position; and, Fig. 2 is a fragmentary cross section showing the relief valve according to this invention with the resilient sealing member removed.

For a clear understanding of the operation of the relief valve according to this invention reference should be made to the drawings wherein the body 10 is formed with an inlet passage or bore 11 and a larger co-axial outlet passage or bore 12. The body 10 is provided with threads 13, so that it may be mounted on either a pressure vessel or in a pressure system, and a second series of threads 14 which may be utilized to attach a vent pipe or the like. A bearing sleeve 16 is secured to the lower end of the body 10 and provides a passage 17 co-axial with the passages in the body in fluid communication therewith. A plurality of inlet openings 18 give fluid communication into the passage 17 and in turn the bore 11. The lower end of the bearing sleeve 16 is formed with a bearing 19 and a spring abutting surface 21.

A valve seat member 22 is mounted in the body 10 between the bores 11 and 12, and is formed with a first valve seat 23 and an axially spaced second valve seat 24. The lower end of the valve seat member 22 is formed with a radially extending surface 26 which opposes the radial extending surface 27 formed in the body 10. A sealing gasket 28 is positioned between these two surfaces and the valve member is urged axially toward the sealing member by the mounting sleeve 29 thereby securely positioning the valve member 22 within the body and providing sealing engagement between the two elements.

A valve stem 31 is positioned in the body and extends through the valve seats 23 and 24 and the bearing 19. The lower end of the valve stem is threaded as at 32 to provide means for mounting the operating spring 33. The spring retaining washer 34 is positioned on the valve stem 31 and is provided with spring abutting surface 36 opposed to the spring abutting surface 21. An adjusting nut 37 is threaded on the threads 32 and provides adjustment of the compression of the spring 33 to adjust the operating pressure of the valve.

The upper end of the valve stem 31 is also formed with threads 38 which provides for the mounting of the valve member assembly. A fixed valve member 39 preferably formed of metal is threaded and permanently fixed and sealed to threads 38 by soft solder. The first valve member 39 is adapted to engage the second valve seat 24 and seal off the passage when such an engagement occurs. The upper portion of the fixed valve member 39 is also provided with a generally radial surface 41 against which the removable valve member 42, preferably formed of a rubber-like material, is positioned by the retainer 43. A nut 44 is threaded on the valve stem 31 above the retainer 43 and urges the retainer and the removable valve member axially toward the valve member 39 into sealing engagement with the radial surface 41. The retainer 43 may be provided with an axial extending peripheral flange 46 which receives the resilient valve member 42. A plurality of guide pins 47 are mounted on the retainer 43 and arranged to engage the walls of the bore 12 and provide radial support of the upper end of the valve stem and valve assembly.

In the preferred form, the second valve seat 24 is generally conical and the portion 48 of the fixed valve member 39 which engages the second valve seat is also conical in form. The axial spacing of the portion 48 and the radial surface 41 is less than the axial spacing of the first valve seat 23 and the second valve seat 24 so that when the removable valve member 42 is mounted on the valve stem, the fixed valve member 39 is spaced from the second valve seat 24. This insures that the engagement between the removable valve member 42 and the first valve seat 23 is maintained when the valve is closed and also insures that the fixed valve member is spaced from its valve seat under normal operating conditions.

Accurate operation of a safety relief valve requires that the area sealed by the valve remains constant so that for any given spring force a predetermined fluid pressure will be necessary before the valve is opened. By providing the spacing of the fixed valve member from the second valve seat during normal operation, this constant sealed area is insured. When, however, the removable valve seal must be serviced or replaced, it is merely necessary to loosen the nut 44 which will permit the valve stem 31 to move under spring force axially downward until the fixed valve member 39 engages the second valve seat 24 at which time fluid is confined by this engagement. The nut 44 may then be completely removed from the valve stem and the retainers and removable valve member serviced or replaced. It is apparent that the fixed valve member will prevent any escape of fluid while the removable valve member is being serviced so that the pressure of the system is maintained. To reassemble the valve, it is merely necessary to position the retainer and removable valve member on the valve stem and tighten the nut 44. This will cause the removable valve member to assume engagement with the first valve seat 23 and seal the fluid. Further tightening until the valve is completely assembled will automatically lift the fixed valve member off of the second valve seat 24 and return the entire valve to its normal operating position.

Since the force of the valve spring 33 is slightly less when the removable valve member is removed due to the movement of the valve spring, the force transmitted to the sealing member is slightly less. The area of the second valve seat should, therefore, be less than the area of the first valve seat so that sufficient sealing force is present to maintain the sealing of the valve. Because the guide pins 47 are mounted on the retainer 43, they are removed during servicing thereby insuring that the conical fixed valve will properly align itself and provide a good seal.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A relief valve comprising an elongated hollow body having one end open to a high pressure region and the other end opening to a region of lower pressure, an elongated valve rod mounted in said hollow body, a spring interposed between said one end of the body and one end of the valve rod biasing the rod toward said one end of the body, a frusto-conical valve seat at the other end of said body, a frusto-conical valve head fixed to said valve rod and arranged to be moved into said valve seat by said spring, said body having a second valve seat at said other end thereof outwardly of the frusto-conical seat and spaced axially therefrom, said second valve seat having a narrow annular edge portion terminating in a plane at right angles to the valve rod, a removable valve head mounted on said rod outwardly of said frusto-conical valve head, said removable valve head having a resilient sealing member mounted on that side thereof adjacent the frusto-conical valve head, said sealing member having a flat face in a plane at right angles to the valve rod and being proportioned to overhang and bear against the narrow annular edge of said second valve seat, and threaded means on the rod outwardly of said removable valve head adapted to be drawn down on the valve rod to push the removable valve head against said second valve seat and thereby move the valve rod axially toward said other end of the body an amount corresponding to the axial spacing between the valve seats and move the frusto-conical valve head off of the frusto-conical seat.

2. A relief valve as defined in claim 1 wherein the removable valve head is provided with radially extending guide pins to maintain the valve rod concentric with respect to the valve seats when the frusto-conical valve is moved from the frusto-conical seat.

References Cited in the file of this patent

UNITED STATES PATENTS

| | | |
|---|---|---|
| 636,391 | Smyth et al. | Nov. 7, 1899 |
| 1,508,291 | Penfield | Sept. 9, 1924 |
| 1,774,690 | Willoughby | Sept. 2, 1930 |
| 2,178,876 | MacClatchie | Nov. 7, 1939 |
| 2,599,622 | Folmsbee | June 10, 1952 |
| 2,614,582 | St. Clair | Oct. 21, 1952 |